United States Patent Office 2,867,627
Patented Jan. 6, 1959

2,867,627

PROCESS FOR THE MANUFACTURE OF POLYENE ALDEHYDES

Otto Isler, Marc Montavon, and Rudolf Rüegg, Basel, and Paul Zeller, Neuallschwil, near Basel, Switzerland, assignors to Hoffmann-La Roche Inc., Nutley, N. J., a corporation of New Jersey No Drawing. Application July 13, 1956
Serial No. 597,566

Claims priority, application Switzerland July 20, 1955

6 Claims. (Cl. 260—340.9)

The present invention relates to a process for the manufacture of polyene aldehydes. This process comprises condensing acetylene by a metal-organic reaction, on the one hand, with an acetal of methylglyoxal and, on the other hand, with a $C_{14}$-aldehyde having the general formula

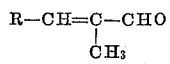

wherein R represents a hydrocarbon radical having the carbon skeleton of geraniol or cyclogeraniol, treating the resulting condensation product with excess lithium-aluminum hydride and hydrolysing the reaction product in acid medium.

The starting materials required for this process can be obtained, e. g., as follows:

4-[2',6'6'-trimethyl-cyclohexen-(2')-ylidene]-2-methyl-buten-(2)-al-(1)—(Hereinafter referred to as dehydro-(retro-$C_{14}$-aldehyde).—30 parts by weight of 4-[2',6',6'-trimethyl - cyclohexen-(1')-yl]-2 - methyl - buten-(2)-al-(1) in 210 parts by weight of methylene chloride together with 13.5 parts by weight of sodium bicarbonate and 9 parts by weight of calcium oxide are cooled to 0° C. To the cooled mixture there are then added 28 parts by weight of N-bromo-succinimide, and the temperature is maintained between 5 and 10° C. for 3 hours by intermittent cooling. After some time the mixture turns yellow to red and then slowly becomes colorless again. After filtering, 30 parts by weight of quinoline are added to the filtrate, and the methylene chloride is removed in vacuo. Then a further 30 parts by weight of quinoline are added, and the mixture is heated on a steam bath in a nitrogen atmosphere for 2 hours. Thereafter, 350 parts by weight of petroleum ether (boiling range 30–60° C.) are added, and the mixture is poured onto a mixture of 250 parts by weight of 3N sulphuric acid and ice, while stirring. After filtering off the formed insoluble resin, the aqueous layer is separated and the petroleum ether solution is washed once with water, dilute sodium bicarbonate solution and water again. After drying of the petroleum ether solution over sodium sulphate and evaporation of the petroleum ether, there are obtained 29.4 parts by weight of crude 4-[2',6',6'-trimethyl-cyclohexen-(2')-ylidene]-2-methyl - buten-(2)-al-(1). For purifying, this product is distilled in a high vacuum in a Hickmann flask; B. P. 90° C./0.03 mm. An entirely pure product is obtained by further distilling this compound through a Vigreux column (30 cm.). The obtained aldehyde is a yellow fluid oil; $n_D^{22}$=1.6152; U. V. absorption maximum at 318 m$\mu$, $$E_{1\,cm.}^{1\%}=1610$$

(in petroleum ether).

4 - [2',6',6' - trimethyl - cyclohexadien - (1',3') - yl]-2-methyl-buten-(2)-al-(1)—(Hereinafter referred to as de-hydro-β-$C_{14}$-aldehyde).—136 parts by weight of 4-[2',6',6'-trimethyl-cyclohexen-(2')-ylidene]-2-methyl - buten-(2)-al-(1) together with 97 parts by volume of isopropenyl acetate and 0.7 part by weight of p-toluene-sulphonic acid are heated at 100–140° C. for 3–4 hours, while passing a slow current of nitrogen through the mixture, the acetone formed during the reaction being continuously removed from the reaction mixture by distillation. After cooling, the thus obtained crude 4-[2',6',6'-trimethyl - cyclohexadien - (1',3')-yl] - 2 - methyl-1-acetoxy-butadiene-(1,3) is directly hydrolysed. For this purpose, 650 parts by volume of methyl alcohol, 65 parts by volume of water and 46 parts by weight of sodium bicarbonate are added, and the mixture is refluxed for 5–6 hours, while stirring. The reaction mixture is then poured into 2000 parts by volume of ice water and weakly acidified with dilute sulphuric acid. The reaction product is taken up in ether, and the ethereal solution is washed with sodium bicarbonate solution and dried over sodium sulphate. After removal of the solvent by distillation, the residue is distilled in a high vacuum. There are thus obtained 98 parts by weight of 4-[2',6',6'-trimethyl-cyclohexadien-(1',3')-yl]-2-methyl - buten - (2)-al-(1); B. P. 80° C./0.05 mm.; $n_D^{22}$=1.530; U. V. absorption maxima at 224 and 268 m$\mu$;

$$E_{1\,cm.}^{1\%}=795 \text{ and } 345$$

respectively (in petroleum ether).

4-[2',6',6'-trimethyl-cyclohexylidene]-2 - methyl-buten-(2) - al - (1)—(Hereinafter referred to as iso - $C_{14}$-aldehyde).—The ethoxy-acetylene carbinol obtained by condensing ethoxy-acetylene with 2,6,6-trimethyl-cyclohexanone-(1) is partially hydrogenated at the triple bond in a manner known per se, the resulting ethoxy-ethylene carbinol is hydrolysed with acid, the resulting 2,6,6-trimethyl-cyclohexylidene-acetaldehyde is acetalised, the acetal is condensed in the presence of an acidic condensing agent with a propenyl ether, and the resulting condensation product is treated with acid.

2,6,10-trimethyl-undecatrien-(2,4,9) - al - (1)—(Hereinafter referred to as pseudo-$C_{14}$-aldehyde).—To a mixture of 500 parts by weight of pseudo-ionone, 500 parts by weight of ethyl chloroacetate and 250 parts by weight of methanol there are gradually added 250 parts by weight of sodium methoxide at −10° C., and the mixture is stirred for 2–3 hours at 0° C., acidified at 0° C. with dilute sulphuric acid and then rapidly extracted with petroleum ether. The petroleum ether solution is boiled for some hours with alcoholic potassium carbonate solution and then poured into water. The alkaline aqueous solution is acidified and extracted with petroleum ether. After evaporation of the petroleum ether the residue is distilled in vacuo. The resulting pseudo-$C_{14}$-aldehyde shows an U. V. absorption maximum at 272–274 m$\mu$ (in petroleum ether solution, after standing for a while).

2 - Oxo - propionaldehyde acetals (methylglyoxal acetals).—These acetals can be prepared from methylglyoxal by heating the latter with alcohols or glycols in inert solvents in the presence of acidic condensing agents while continuously distilling off the water formed during the reaction.

In the first step of the process of the present invention β- or dehydro-β- or iso- or dehydro-(retro)- or pseudo-$C_{14}$-aldehyde is reacted with an alkali or alkaline earth metal acetylide in liquid ammonia, and the resulting condensation product, preferably after having been hydrolysed to 6-[2',6',6'-trimethyl-cyclohexen-(1')-yl]- or 6 - [2',6',6 - trimethyl - cyclohexadien - (1',3') - yl] - or 6-[2',6',6'-trimethyl-cyclohexylidene]- or 6-[2',6',6'-trimethyl-cyclohexen-(2')-ylidene]- or 6-[2',6'-dimethyl-hepten - (5') - ylidene] - 4 - methyl - hexen - (4) - yne - (1)-ol-(3) [hereinafter referred to as β- or dehydro-β- or iso- or dehydro-(retro)- or pseudo-$C_{16}$-acetylene carbinol], is condensed with a methylglyoxal acetal by a metal-organic reaction. The condensation in liquid ammonia can be carried out at elevated pressure and at room temperature or at normal atmospheric pressure and at the boiling temperature of ammonia. The condensation is effected with an alkali metal acetylide, such as sodium or lithium acetylide, or with an alkaline earth metal acetylide, such as calcium acetylide, which is conveniently prepared prior to the condensation reaction from alkali or alkaline earth metal and acetylene in the same vessel and the same ammonia in which the condensation is to be carried out. Preferably lithium acetylide is used for the condensation. The $C_{14}$-aldehyde can be added in an inert solvent such as diethyl ether. The hydrolysis of the condensation product can be brought about, e. g., in liquid ammonia by the addition of an ammonium salt or after removal of the ammonia by treatment with acid. The $C_{16}$-acetylene carbinols are colourless to yellowish oils which can be distilled and which show characteristic absorption maxima in the U. V. spectrum (with the exception of $\beta$-$C_{16}$-acetylene carbinol which has no absorption maximum above 225 m$\mu$). In the active hydrogen determination according to Zerewitinoff they show 1 mole of active hydrogen atoms in the cold and 2 moles of active hydrogen atoms at elevated temperature. The condensation of the $C_{16}$-acetylene carbinols with methylglyoxal acetal is effected by means of a metal-organic reaction, for instance, by subjecting the $C_{16}$-acetylene carbinol to the action of 2 moles of alkyl magnesuim halide or 2 moles of phenyl-lithium in an inert solvent. The first mole of alkyl magnesuim halide is attached to the hydroxyl group whereas the second mole reacts with the acetylene bond so that the terminal carbon atom becomes capable of condensation. The resulting di-magnesuim halide or di-lithium compound is then conveniently reacted in the same solvent with methylglyoxal acetal. For this purpose there may be used lower aliphatic acetals, such as 1,1-dimethoxy- or 1,1-diethoxy- or 1,1-dibutoxy-propanone-(2) [methylglyoxal dimethyl- or diethyl- or dibutylacetal], or cyclic acetals, such as 1,1-ethylenedihydroxy-propanone-(2) [methylglyoxal ethylene-acetal]. The $C_{16}$-acetylene carbinol is preferably treated in an inert solvent, e. g. diethyl ether, with 2 moles of alkyl-magnesium halide, and the resulting di-magnesium halide compound, without being isolated and purified, is condensed with 1 mole of methylglyoxal acetal. The condensation product, conveniently without purification, is hydrolysed by conventional methods, e. g. by pouring it into a mixture of ice and dilute sulphuric acid to obtain the $C_{19}$-dihydroxy-aldehyde acetal corresponding to the starting $C_{16}$-acetylene carbinol and methylglyoxal acetal. There is obtained 8-[2',6',6'-trimethyl-cyclohexen-(1')-yl]- or 8-[2',6',6'-trimethyl-cyclohexadien-(1',3')-yl]- or 8-[2',6',6'-trimethyl-cyclohexylidene]- or 8-[2',6',6'-trimethyl-cyclohexen-(2')-ylidene]- or 8-[2',6'-dimethyl-hepten-(5')-ylidene] - 2,6 - dimethyl - 2,5 - dihydroxy - octen - (6) - yne-(3)-acetal-(1) [hereinafter referred to as $\beta$- or dehydro-$\beta$- or iso- or dehydro-(retro)- or pseudo-$C_{19}$-dihydroxyaldehyde-acetal] from $\beta$- or dehydro-$\beta$- or iso- or dehydro-(retro)- or pseudo-$C_{16}$-acetylene carbinol and methylglyoxal acetal. The $C_{19}$-dihydroxyaldehyde-acetals are viscous oils which have 2 moles of active hydrogen atoms as determined by the method according to Zerewitinoff.

A further mode of carrying out the first step of the process of the present invention consists in first reacting the methylglyoxal acetal in liquid ammonia with an alkali or alkaline earth metal acetylide, and reacting the resulting condensation product, preferably after hydrolysis to the 2-methyl-2-hydroxy-butyne-(3)-acetal-(1), with the $C_{14}$-aldehyde by a metal-organic reaction to obtain the above mentioned $C_{19}$-dihydroxyaldehyde-acetals. The 2-methyl-2-hydroxy-butyne-(3)-acetals-(1) are colourless oils which can be distilled. They have 1 mole of active hydrogen atoms in the cold and 2 moles of active hydrogen atoms at elevated temperature as determined by the Zerewitinoff method.

In the second step of the present process the $C_{19}$-dihydroxyaldehyde-acetals are treated with excess lithium-aluminum hydride. In this reaction the triple bond is partially hydrogenated, and—surprisingly—the hydroxyl groups are simultaneously eliminated with formation of a new double bond. The simultaneous partial hydrogenation and elimination of the hydroxyl groups are preferably effected by treating the $C_{19}$-dihydroxyaldehyde-acetal in an inert solvent with excess lithium-aluminum hydride at room temperature or at elevated temperature. Solvents which may be used for this purpose include aliphatic or cyclic ethers such as diethyl ether, ethylene glycol dimethyl ether and dioxane; and organic tertiary amines such as N,N-diethyl aniline and N-ethyl morpholine. In the preferred mode of operation the $C_{19}$-dihydroxyaldehyde-acetal is stirred in N,N-diethyl aniline with 2–4 moles of lithium-aluminum hydride at 60–120° C. in a nitrogen atmosphere. There is thus obtained 8-[2',6',6'-trimethyl-cyclohexen-(1')-yl]- or 8-[2',6',6'-trimethyl-cyclohexadien-(1',3')-yl]- or 8-[2',6',6'-trimethyl-cyclohexen-(2')-hexylidene]- or 8-[2',6',6'-trimethyl-cyclohexen-(2')-ylidene]- or 8-[2',6'-dimethyl-hepten-(5')-ylidene]-2,6-dimethyl-octatrien-(2,4,6)-acetal-(1) [hereinafter referred to as $\beta$- or dehydro-$\beta$- or iso- or dehydro-(retro)- or pseudo-$C_{19}$-acetal] from $\beta$- or dehydro-$\beta$- or iso- or dehydro-(retro)- or pseudo-$C_{19}$-dihydroxyaldehyde-acetal. These $C_{19}$-acetals are viscous oils which show characteristic absorption maxima in the U. V. spectrum.

In the last step of the present process the $C_{19}$-acetals are hydrolysed in an acidic medium to obtain the corresponding $C_{19}$-aldehydes. The hydrolysis is carried out in a manner known per se, e. g. by stirring the $C_{19}$-acetals in the presence of water in a water-miscible solvent with a mineral acid, e. g. sulphuric acid, or an organic acid, e. g. acetic acid or p-toluene-sulphonic acid at room temperature or elevated temperature. The $C_{19}$-acetals are conveniently heated for a short time with 90% acetic acid at 95° C. or stirred for some hours with dilute sulphuric acid in alcoholic solution at room temperature.

The $C_{19}$-aldehydes obtained by the process according to the present invention possess characteristic absorption maxima in the U. V. spectrum. Due to the cis-trans-isomerism at the double bonds these aldehydes exist in several stereoisomeric forms. In order to avoid losses of substance due to decomposition, it is advisable to operate in an inert atmosphere throughout the process.

The products of the present process are valuable intermediates in the synthesis of $\beta$-carotene and carotenoids such as, e. g., bisdehydro-carotene and lycopene. They can be added to acetylene at both ends by a metal-organic reaction, the formed $C_{40}$-diol can be dehydrated by treatment with dehydrating agents, and the resulting dehydration product can be converted into the corresponding carotenoid by partial hydrogenation of the triple bond and subsequent isomerisation. In this manner there can be prepared $\beta$-carotene from $\beta$-$C_{19}$-aldehyde, bisdehydro-carotene from dehydro-$\beta$-$C_{19}$-aldehyde, $\beta$-carotene from iso-$C_{19}$-aldehyde, and bisdehydro-carotene from dehydro-(retro)-$C_{19}$-aldehyde. All these carotenoids are suitable for dyeing fats.

The invention will now be illustrated by the following examples, however without being limited thereto.

EXAMPLE 1

$\beta$-$C_{19}$-aldehyde (a) $\beta$-$C_{16}$-acetylene carbinol.—Into a solution of 1 part by weight of lithium in 400 parts by volume of liquid ammonia there was passed dry, acetone-free acetylene until the lithium was completely reacted. Then, there was added within 15 minutes, while vigorously stirring, a solution of 25 parts by weight of 4-[2',6',6'-trimethyl-cyclohexen-(1')-yl]-2-methyl-buten - (2) - al - (1) in 100 parts by volume of dry ether, and the reaction mixture was thoroughly stirred for 20 hours with exclusion of humidity. Then, 16 parts by weight of ammonium chloride were added in small portions, and the ammonia was allowed to evaporate. After the addition of 120 parts by volume of water and 100 parts by volume of ether the ether layer was separated, washed with water, dried over sodium sulphate and concentrated. The residue was distilled in a high vacuum to obtain 27.5 parts by weight of 6-[2',6',6'-trimethyl-cyclohexen-(1')-yl]-4-methyl-hexen-(4)-yne-(1)-ol-(3); B. P. 100° C./0.02 mm.; $n_D^{26}$=1.510.

(b) *Ethylen-acetal of β-$C_{19}$-dihydroxy-aldehyde.*—23.2 parts by weight of 6-[2',6',6'-trimethyl-cyclohexen-(1')-yl]-4-methyl-hexen-(4)-yne-(1)-ol-(3) were dissolved in 100 parts by volume of absolute ether, and the solution was gradually added at 10–15° C., while stirring, to an ethyl-magnesium bromide solution prepared from 5.4 parts by weight of magnesium and 26 parts by weight of ethyl bromide in 100 parts by volume of absolute ether. Thereafter, the mixture was refluxed for 1 hour and then cooled with ice water, and there was gradually added thereto at 20° C. a solution of 12 parts by weight of methylglyoxal ethylenacetal (prepared by heating for 6 hours 1 mole of methylglyoxal with 1.2 moles of ethylene glycol and 0.001 mole of p-toluene-sulphonic acid in benzene solution while continuously distilling off the water formed in the reaction, extraction of the resulting benzene solution with dilute sodium bicarbonate solution, evaporation of the solvent and vacuum distillation of the residue; B. P. 102° C./10 mm.; $n_D^{26}$=1.4145) in 50 parts by volume of absolute ether. The mixture was refluxed for 5–7 hours. The reaction mixture was then poured onto a mixture of 130 parts by volume of 3 N sulphuric acid and 200 parts by weight of ice. The ether layer was separated, washed with water and 5% sodium bicarbonate solution, dried over sodium sulphate and concentrated. There were thus obtained 35.5 parts by weight of oily 8-[2',6',6'-trimethyl-cyclohexen-(1')-yl]-2,6-dimethyl-2,5-dihydroxy-octen-(6)-yne-(3)-ethylenacetal-(1). This product can be purified by distribution between solvents and chromatography. The active hydrogen determination according to Zerewitinoff showed 2 moles of active hydrogen atoms.

(c) *Ethylenacetal of β-$C_{19}$-aldehyde.*—5.2 parts by weight of the product obtained according to paragraph (b) of this example were dissolved in 140 parts by volume of N,N-diethyl aniline, and to the resulting solution there was gradually added a solution of 1.7 parts by weight of lithium-aluminum hydride in 45 parts by volume of absolute ether at 5–10° C., while stirring. The mixture was heated at 75° C. for 20 hours. The reaction mixture was then poured onto a mixture of 250 parts by volme of 3 N sulphuric acid and 200 parts by weight of ice, and the mixture was extracted with 100 parts by volume of petroleum ether. The petroleum ether solution was washed successively with ice-cold 3 N sulphuric acid, water and dilute sodium bicarbonate solution, dried over sodium sulphate and concentrated. There were thus obtained 4.9 parts by weight of crude 8-[2',6',6'-trimethyl-cyclohexen-(1')-yl]-2,6-dimethyl-octatrien-(2,4,6)-ethyl-enacetal-(1). This product can be purified by distribution between solvents and chromatography; yellowish oil having absorption maxima in the U. V. spectrum at 278 and 289 mμ in petroleum ether.

(d) *β-$C_{19}$-aldehyde.*—5 parts by weight of 8-[2',6',6'-trimethyl-cyclohexen-(1')-yl]-2,6-dimethyl-octatrien-(2,4,6)-ethylen-acetal-(1) were dissolved in 90 parts by volume of glacial acetic acid, 10 parts by volume of water and 10 parts by weight of sodium acetate were added to the solution, and the mixture was heated for 2 hours at 95° C. in a nitrogen atmosphere. The reaction solution was then cooled, diluted with 200 parts by volume of water and extracted with 100 parts by volume of petroleum ether. The petroleum ether solution was washed with water and diluted sodium bicarbonate solution, dried over sodium sulphate and concentrated. The residue crystallised from petroleum ether or methanol and yielded 8-[2',6',6'-trimethyl-cyclohexen-(1')-yl] - 2,6 - dimethyl-octatrien-(2,4,6)-al-(1) of M. P. 62–63° C.; U. V. absorption maxima at 311–313 and 323–325 mμ in petroleum ether. The phenyl semicarbazone was obtained in the form of yellow needles from methylene chloride-methanol; M. P. 204–206° C.; U. V. absorption maxima at 332 and 347 mμ in petroleum ether.

EXAMPLE 2

β-$C_{19}$-aldehyde (a) *2 - methyl - 2 - hydroxy - butyne - (3) - al - (1) - dibutylacetal.*—Into a solution of 7.2 parts by weight of lithium in 600 parts by volume of liquid ammonia there was passed dry, acetone-free acetylene until the lithium was completely reacted. Then, there was added to the solution within 10 minutes, while stirring, a solution of 121 parts by weight of 1,1-dibutoxy-propanone-(2) in 300 parts by volume of absolute ether, and the mixture was shaken in an autoclave for 20 hours at room temperature. To the reaction mixture there were then slowly added 114 parts by weight of ammonium chloride, and the ammonia was allowed to evaporate. 1000 parts by volume of dry ether were added to the residue, the lithium chloride and the excess ammonium chloride were filtered off, the ether was evaporated, and the residue was fractionated in vacuo. There were thus obtained 105 parts by weight of dibutylacetal of 2-methyl-2-hydroxy-butyne-(3)-al-(1); B. P. 130–135° C./15 mm. The active hydrogen determination according to Zerewitinoff showed 1 mole of active hydrogen atoms in the cold and 2 moles of active hydrogen atoms at elevated temperature.

(b) *Dibutylacetal of β-$C_{19}$-dihydroxy-aldehyde.*—23 parts by weight of dibutylacetal of 2-methyl-2-hydroxy-butyne-(3)-al-(1) were dissolved in 50 parts by volume of absolute ether, and the solution was gradually added at 10–15° C., while stirring, to a Grignard solution prepared from 5.4 parts by weight of magnesium and 26 parts by weight of ethyl bromide in 100 parts by volume of absolute ether. The mixture was then refluxed for 60 minutes, thereafter cooled with ice water, and there was gradually added thereto a solution of 20 parts by weight of 4-[2',6',6' - trimethyl-cyclohexen-(1')-yl]-2-methyl-buten-(2)-al-(1) in 100 parts by volume of absolute ether. The mixture was refluxed for 6–8 hours. The reaction mixture was then worked up according to Example 1(b), and there were obtained 43 parts by weight of oily 8-[2',6',6'-trimethyl - cyclohexen - (1') - yl] - 2,6 - dimethyl - 2,5-dihydroxy - octen - (6) - yne - (3) - dibutyl-acetal-(1). This product can be purified by distribution between solvents and chromatography. The active hydrogen determination according to Zerewitinoff showed 2 moles of active hydrogen atoms.

(c) *Dibutylacetal of β-$C_{19}$-aldehyde.*—6 parts by weight of 8-[2,6',6'-trimethyl-cyclohexen-(1')-yl]-2,6-dimethyl-2,5-dihydroxy-octen-(6)-yne-(3)-dibutylacetal-(1) were dissolved in 140 parts by volume of dry ether, and to the solution there was slowly added at 5–10° C., while stirring, a solution of 2 parts by weight of lithium-aluminum hydride in 50 parts by volume of absolute ether. The mixture was refluxed for 50 hours. The reaction mixture was then worked up according to Example 1(c) to obtain crude 8 - [2',6',6' - trimethyl - cyclohexen - (1') - yl] - 2,6 - dimethyl - octatrien - (2,4,6) - dibutyl - acetal - (1). This product can be purified by chromatography; U. V. absorption maxima at 278 and 289 mμ in petroleum ether.

(d) *β-$C_{19}$-aldehyde.*—5.5 parts by weight of 8-[2',6',6'-trimethylcyclohexen - (1')-yl] - 2,6 - dimethyl - octatrien-(2,4,6)-dibutyl-acetal-(1) were dissolved in 100 parts by volume of ethyl alcohol, 5 parts by volume of 3 N sulphuric acid were added to the solution, and the mixture was allowed to stand for 20 hours at room temperature in a nitrogen atmosphere. The reaction mixture was then diluted with 200 parts by volume of water and extracted with petroleum ether. The petroleum ether solution was washed with dilute sodium bicarbonate solution, dried over sodium sulphate and concentrated to remove the petroleum ether. Upon recrystallisation of the residue from petroleum ether or methanol there was obtained 8 - [2',6',6' - trimethyl - cyclohexen - (1') - yl] - 2,6-dimethyl-octatrien-(2,4,6)-al-(1) in the form of yellowish crystals of M. P. 62–63° C.

EXAMPLE 3

Dehydro-β-$C_{19}$-aldehyde (a) *Dehydro-β-$C_{16}$-acetylene carbinol.*—By condensing 27.8 parts by weight of 4-[2',6',6'-trimethyl-cyclohexadien-(1',3')-yl]-2-methyl-buten-(2)-al-(1) with lithium acetylide and working up the reaction product in the manner described in Example 1(a), there was obtained 6-[2',6',6' - trimethyl - cyclohexadien - (1',3') - yl] - 4-methyl-hexen-(4)-yne-(1)-ol-(3) in the form of a yellowish oil of B. P. 110° C./0.04 mm.; $n_D^{23}$=1.528; U. V. absorption maximum at 266 mμ in petroleum ether.

(b) *Ethylen-acetal of dehydro-β-$C_{19}$-dihydroxy-aldehyde.*—By condensing 11.5 parts by weight of 6-[2',6',6'-trimethyl - cyclohexadien - (1',3') - yl] - 4 - methyl-hexen-(4)-yne-(1)-ol-(3) with methylglyoxal ethylen-acetal and working up the reaction product in the manner described in Example 1(b), there was obtained the 8-[2',6',6' - trimethyl - cyclohexadien - (1',3') - yl] - 2,6 - dimethyl - 2,5 - dihydroxy - octen - (6) - yne - (3) - ethylen-acetal-(1) in the form of a yellowish oil; U. V. absorption maximum at 266 mμ in petroleum ether.

(c) *Ethylen-acetal of dehydro-β-$C_{19}$-aldehyde.*—By treating 17 parts by weight of 8-[2',6',6'-trimethyl-cyclohexadien - (1',3') - yl] - 2,6 - dimethyl - 2,5 - dihydroxy-octen-(6)-yne-(3)-ethylen-acetal-(1) with lithium-aluminum hydride and working up the reaction product in the maner described in Example 1(c), there was obtained 8 - [2',6',6' - trimethyl - cyclohexadien - (1',3') - yl]-2,6 - dimethyl - octatrien - (2,4,6) - ethylene-acetal-(1); U. V. absorption maximum at 281 mμ in petroleum ether.

(d) *Dehydro-β-$C_{19}$-aldehyde.*—By saponifying 8-[2',6',6' - trimethyl - cyclohexadien - (1',3') - yl] - 2,6 - dimethyl - octatrien - (2,4,6) - ethylen - acetal - (1) according to Example 1(d), there was obtained 8-[2',6',6'-trimethyl - cyclohexadien - (1',3') - yl] - 2,6 - dimethyl-octatrien-(2,4,6)-al-(1). From petroleum ether this product was obtained in the form of yellowish crystals of M. P. 64–66° C.; U. V. absorption maximum at 315 mμ in petroleum ether. Phenyl-semicarbazone M. P. 197–200° C.; U. V. absorption maxima at 333 and 348 mμ in petroleum ether.

EXAMPLE 4

Iso-$C_{19}$-aldehyde (a) *Dibutylacetal of iso-$C_{19}$-dihydroxy-aldehyde.*—By condensing 2.85 parts by weight of 4-[2',6',6'-trimethyl-cyclohexylidene]-2-methyl-buten-(2)-al-(1) with 3.3 parts by weight of 2-methyl-2-hydroxy-butyne-(3)-al-(1)-dibutylacetal in the manner described in Example 2(b), there was obtained 8-[2',6',6'-trimethyl-cyclohexylidene]-2,6 - dimethyl - 2,5 - dihydroxy - octen - (6) - yne - (3)-dibutyl-acetal-(1); U. V. absorption maximum at 250 mμ in petroleum ether.

(b) *Dibutylacetal of iso-$C_{19}$-aldehyde.*—By treating 5.1 parts by weight of 8-[2',6',6'-trimethyl-cyclohexylidene]-2,6-dimethyl-2,5-dihydroxy-octen-(6)-yne - (3)-dibutylacetal-(1) with 1.7 parts by weight of lithium-aluminum hydride in the manner described in Example 1 (c), there was obtained 8-[2',6',6'-trimethyl-cyclohexylidene]-2,6-dimethyl-octatrien-(2,4,6) - dibutylacetal - (1); U. V. absorption maxima at 307, 321 and 338 mμ in petroleum ether.

(c) *Iso-$C_{19}$-aldehyde.*—By saponifying 8-[2',6',6'-trimethyl-cyclohexylidene]-2,6-dimethyl-octatrien - (2,4,6)-dibutylacetal-(1) according to Example 1 (d), there was obtained 8-[2',6',6'-trimethyl-cyclohexylidene]-2,6-dimethyl-octatrien-(2,4,6)-al-(1) in the form of a yellowish oil; U. V. absorption maxima at 334, 356 and 376 mμ in petroleum ether. The phenylsemicarbazone was obtained from methylene chloride-methanol in the form of yellow needles of M. P. 201–203° C.; U. V. absorption maxima at 352, 369 and 391 mμ in petroleum ether.

EXAMPLE 5

Dehydro-(retro)-$C_{19}$-aldehyde (a) *Dehydro-(retro)-$C_{16}$-acetylene carbinol.*—By condensing 12.5 parts by weight of 4-[2',6',6'-trimethyl-cyclohexen-(2')-ylidene]-2-methyl-buten-(2)-al-(1) with lithium acetylide and working up the reaction product in the manner described in Example 1(a), there was obtained 6-[2',6',6'-trimethyl-cyclohexen-(2') - ylidene] - 4-methylhexen-(4)-yne-(1)-ol-(3) in the form of a yellow oil of B. P. 109° C./0.05 mm.; $n_D^{23}$=1.572; U. V. absorption maximum at 285.5 mμ in petroleum ether.

(b) *Ethylen-acetal of dehydro-(retro)-$C_{19}$-dihydroxy-aldehyde.*—By condensing 11.7 parts by weight of 6-[2',6',6'-trimethyl-cyclohexen-(2')-ylidene]-4-methyl - hexen-(4)-yne-(1)-ol-(3) with methylglyoxal ethylen-acetal and working up the reaction mixture in the manner described in Example 1(b), there was obtained 8-[2',6',6'-trimethyl-cyclohexen(2')-ylidene]-2,6-dimethyl - 2,5 - dihydroxy-octen-(6)-yne-(3)-ethylenacetal-(1) in the form of a yellowish oil; U. V. absorption maximum at 285.5 mμ in petroleum ether.

(c) *Ethylen-acetal of dehydro-(retro)-$C_{19}$-aldehyde.*—By treating 17 parts by weight of 8-[2',6',6'-trimethyl-cyclohexen-(2')-ylidene]-2,6 - dimethyl - 2,5 - dihydroxy-octen-(6)-yne-(3)-ethylen-acetal-(1) with lithium-aluminum hydride and working up the reaction product in the manner described in Example 1(c), there was obtained 8-[2',6',6'-trimethyl-cyclohexen-(2')-ylidene]-2,6-dimethyl-octatrien-(2,4,6)-ethylen-acetal-(1); U. V. absorption maxima at 347 and 365 mμ in petroleum ether.

(d) *Dehydro-(retro)-$C_{19}$-aldehyde.*—By saponifying 8-[2',6',6'-trimethyl-cyclohexen-(2')-ylidene]-2,6-dimethyl-octatrien-(2,4,6)-ethylen-acetal-(1) according to Example 1(d), there was obtained 8-[2',6',6'-trimethyl-cyclohexen-(2')-ylidene]-2,6-dimethyl-octatrien - (2,4,6)-al-(1) in the form of a yellow oil; U. V. absorption maxima at 383 and 403 mμ in petroleum ether. The phenylsemicarbazone was obtained from methylene chloride-methanol in the form of yellow crystals of M. P. 198–201° C.; U. V. absorption maxima at 373, 393 and 417 mμ in petroleum ether.

The 2-oxo-1-propanal-ethylene acetal used as starting material in the above examples was prepared as follows:

1 mol of methylglyoxal and 1.2 mols of ethylene glycol were heated for several hours in 250 parts by volume of benzene in the presence of a catalytic quantity of p-toluene sulfonic acid, while continuously distilling off the water formed. The reaction mixture was then cooled down, poured on cold sodium bicarbonate solution, the benzene solution was separated, dried over sodium sulfate and the solvent was driven off. By distillation of the residue, there was obtained the ethylene acetal of methylglyoxal (B. P.$_{10}$: 102°; $n_D^{26}$=1.4845).

We claim:

1. A process which comprises condensing a compound selected from the group consisting of 6-[2',6',6'-trimethylcyclohexen-(1')-yl-]-4-methyl - 3 - hydroxy - hexen-(4)-yne-(1), 6-[2',6',6'-trimethyl-cyclohexadien-(1',3')-yl]-4-methyl-3-hydroxyhexen(4)-yne-(1), 6-[2',6',6'-trimethylcyclohexylidene]-4-methyl-3-hydroxy-hexen-(4)-yne-(1), 6-[2'6',6'-trimethyl-cyclohexen-(2')-ylidene]-4-methyl-3-hydroxy-hexen-(4)-yne-(1) and 6-[2',6'-dimethyl-hepten-(5')-ylidene]-4-methyl-3-hydroxy-hexen-(4)-yne-(1) by a Grignard reaction with a compound selected from the group consisting of the lower alkyl acetals and the ethylene acetal of methylglyoxal and hydrolysing the metal-organic compound obtained.

2. A process which comprises condensing acetylene through one of its carbon atoms with a $C_{14}$-aldehyde selected from the group consisting of 4-[2',6',6'-trimethyl-cyclohexen - (1') - yl] - 2 - methyl-buten - (2) - al - (1), 4 - [2',6',6' - trimethyl-cyclohexadien - (1',3') - yl]-2-methyl-buten - (2) - al - (1), 4 - [2',6',6' - trimethyl-cyclohexylidene] - 2 - methyl-buten - (2) - al - (1), 4 - [2',6', 6' - trimethyl-cyclohexen - (2') - ylidene] - 2 - methyl-buten - (2) - al - (1), and 4-[2',6' - dimethyl-hepten-(5')-ylidene] - 2 - methyl-buten - (2) - al - (1), and through the other of its carbon atoms with an acetal selected from the group consisting of the lower alkyl acetals and the ethylene acetal of methylglyoxal, thereby producing the corresponding $C_{19}$-dihydroxyaldehyde-acetal selected from the group consisting of the lower alkyl acetals and the ethylene acetal of 8 - [2',6',6'-trimethyl-cyclohexen-(1')-yl] - 2,6-dimethyl - 2,5 - dihydroxy-octaen -(6)-yne - 3 - al-(1), 8 - [2',6',6' - trimethyl-cyclohexadien-(1',3')-yl]-2,6 - dimethyl - 2,5 - dihydroxy-octaen-(6)-yne-3-al-(1), 8 - [2',6',6' - trimethyl-cyclohexylidene] - 2,6 - dimethyl-2,5 - dihydroxy-octaen - (6) - yne - 3 - al - (1), 8 - [2',6', 6' - trimethyl-cyclohexen - (2') - ylidene] - 2,6 - dimethyl-2,5 - dihydroxy-octaen-(6) - yne - 3 - al - (1), and 8-[2', 6' - dimethyl-hepten - (5') - ylidene] - 2,6 - dimethyl-2,5-dihydroxy-octaen - (6) - yne - 3 - al - (1); mixing said $C_{19}$-dihydroxyaldehyde-acetal in an inert solvent with excess lithium aluminum hydride and hydrolyzing the metal-organic compound obtained, thereby producing the corresponding $C_{19}$-acetal selected from the group consisting of the lower alkyl acetals and the ethylene acetal of 8-[2', 6',6' - trimethyl-cyclohexen - (1') - yl] - 2,6 - dimethyl-octatrien - (2,4,6) - al - (1), 8 - [2',6',6' - trimethyl-cyclohexadien - (1',3') - yl] - 2,6 - dimethyl-octatrien - (2,4,6)-al - (1), 8 - [2',6',6' - trimethyl-cyclohexylidene]-2,6-dimethyl-octatrien - (2,4,6) - al - (1), 8-[2',6',6'-trimethyl-cyclohexen - (2') - ylidene] - 2,6 - dimethyl-octatrien-(2,4,6) - al - (1), and 8 - [2',6' - dimethyl-hepten - (5')-ylidene] - 2,6 - dimethyl-octatrien - (2,4,6) - al - (1); and splitting off the protective acetal grouping from said $C_{19}$-acetal, thereby producing the corresponding $C_{19}$-aldehyde selected from the group consisting of 8-[2',6',6'-trimethyl-cyclohexen - (1') - yl] - 2,6 - dimethyl-octatrien-(2,4,6)-al-(1), 8 - [2',6',6' - trimethyl-cyclohexadien - (1',3')-yl]-2,6 - dimethyl-octatrien - (2,4,6) - al - (1), 8 - [2',6',6'-trimethyl-cyclohexylidene] - 2,6 - dimethyl-octatrien - (2, 4,6) - al - (1), 8 - [2',6',6' - trimethyl-cyclohexen - (2')-ylidene] - 2,6 - dimethyl-octatrien - (2,4,6) - al - (1), and 8 - [2',6' - dimethyl-hepten - (5') - ylidene] - 2,6-dimethyl-octatrien-(2,4,6)-al-(1).

3. A process which comprises mixing excess lithium aluminum hydride in an inert solvent with a $C_{19}$-dihydroxyaldehyde-acetal selected from the group consisting of the lower alkyl acetals and the ethylene acetal of 8-[2',6',6'-trimethyl-cyclohexen - (1') - yl] - 2,6 - dimethyl - 2,5-dihydroxy-octaen - (6) - yne - 3 - al - (1), 8 - [2',6',6'-trimethyl-cyclohexadien - (1',3') - yl] - 2,6 - dimethyl - 2,5-dihydroxy-octaen - (6) - yne - 3 - al - (1), 8 - [2',6',6'-trimethyl-cyclohexylidene] - 2,6 - dimethyl - 2,5 - dihydroxy-octaen - (6) - yne - 3 - al - (1), 8 - [2',6',6' - trimethyl-cyclohexen - (2') - ylidene] - 2,6 - dimethyl - 2,5-dihydroxy-octaen - (6) - yne - 3 - al - (1), and 8 - [2',6'-dimethyl-hepten - (5') - ylidene] - 2,6 - dimethyl - 2,5-dihydroxy-octaen - (6) - yne - 3 - al - (1) and hydrolyzing the metal-organic compound obtained, thereby producing the corresponding $C_{19}$-acetal selected from the group consisting of the lower alkyl acetals and the ethylene acetal of 8 - [2',6',6' - trimethyl-cyclohexen - (1') - yl] - 2,6-dimethyl-octatrien - (2,4,6) - al - (1), 8 - [2',6',6'-trimethyl-cyclohexadien - (1',3') - yl] - 2,6 - dimethyl-octatrien - (2, 4,6) - al - (1), 8 - [2',6',6' - trimethyl-cyclohexylidene]-2,6 - dimethyl-octatrien - (2,4,6) - al - (1), 8 - [2',6',6'-trimethyl-cyclohexen - (2') - ylidene] - 2,6 - dimethyl-octatrien - (2,4,6) - al - (1), and 8 - [2',6' - dimethyl-hepten - (5') - ylidene] - 2,6 - dimethyl-octatrien - (2,4, 6)-al-(1).

4. A process which comprises heating excess lithium aluminum hydride in diethyl aniline with a $C_{19}$-dihydroxyaldehyde-acetal selected from the group consisting of the lower alkyl acetals and the ethylene acetal of 8-[2',6',6'-trimethyl-cyclohexen - (1') - yl] - 2,6 - dimethyl - 2,5-dihydroxy-octaen - (6) - yne - 3 - al - (1), 8 - [2',6',6'-trimethyl-cyclohexadien - (1',3') - yl] - 2,6 - dimethyl - 2,5-dihydroxy-octaen - (6) - yne - 3 - al - (1), 8 - [2',6',6'-trimethyl-cyclohexylidene] - 2,6 - dimethyl - 2,5 - dihydroxy-octaen - (6) - yne - 3 - al - (1), 8 - [2',6',6' - trimethyl-cyclohexen - (2') - ylidene] - 2,6 - dimethyl - 2,5 - dihydroxy-octaen - (6) - yne - 3 - al - (1), and 8 - [2',6'-dimethyl-hepten - (5') - ylidene] - 2,6-dimethyl - 2,5-dihydroxy-octaen - (6) - yne - 3 - al - (1) and hydrolyzing the metal-organic compound obtained, thereby producing the corresponding $C_{19}$-acetal selected from the group consisting of the lower alkyl acetals and the ethylene acetal of 8 - [2',6',6' - trimethyl-cyclohexen - (1') - yl] - 2,6-dimethyl-octatrien - (2,4,6) - al - (1), 8 - [2',6',6'-trimethyl-cyclohexadien - (1',3') - yl] - 2,6 - dimethyl-octatrien-(2, 4,6) - al - (1), 8 - [2',6',6' - trimethyl-cyclohexylidene]-2,6 - dimethyl-octatrien - (2,4,6) - al - (1), 8 - [2',6',6'-trimethyl-cyclohexen - (2') - ylidene] - 2,6 - dimethyl-octatrien - (2,4,6) - al - (1), and 8 - [2',6' - dimethyl-hepten-(5') - ylidene] - 2,6 - dimethyl-octatrien - (2,4,6)-al-(1).

5. A process which comprises heating excess lithium aluminum hydride in diethyl aniline with the ethylene acetal of 8 - [2',6',6' - trimethyl-cyclohexen - (1') - yl]-2,6 - dimethyl - 2,5 - dihydroxy-octaen - 6 - yne - 3 - al-(1) and hydrolyzing the metal-organic compound obtained, thereby producing the ethylene acetal of 8-[2',6', 6' - trimethyl-cyclohexen - (1') - yl] - 2,6 - dimethyl-octatrien-(2,4,6)-al-(1).

6. A process which comprises heating excess lithium aluminum hydride in diethyl aniline with a lower alkyl acetal of 8 - [2',6',6' - trimethyl-cyclohexen - (1') - yl]-2,6 - dimethyl - 2,5 - dihydroxy-octaen - 6 - yne - 3 - al-(1) and hydrolyzing the metal-organic compound obtained, thereby producing a lower alkyl acetal of 8-[2',6', 6' - trimethyl-cyclohexen - (1') - yl] - 2,6 - dimethyl-octatrien-(2,4,6)-al-(1).

References Cited in the file of this patent
UNITED STATES PATENTS

| 2,382,086 | Milas | Aug. 14, 1945 |
| 2,655,548 | Evans et al. | Oct. 13, 1953 |
| 2,671,112 | Inhoffen et al. | Mar. 2, 1954 |
| 2,676,992 | Humphlett | Apr. 27, 1954 |

OTHER REFERENCES

Norman G. Gaylord: Reduction with Complex Metal Hydrides, Interscience Publisher, New York, page 971, 1956.